United States Patent
Nychka et al.

(10) Patent No.: US 8,205,057 B2
(45) Date of Patent: Jun. 19, 2012

(54) METHOD AND SYSTEM FOR INTEGRATED PIPELINE WRITE HAZARD HANDLING USING MEMORY ATTRIBUTES

(75) Inventors: Robert Nychka, Canton, TX (US); Prashanth Karnamadakala, Bangalore (IN); Nilesh Acharya, Mumbai (IN)

(73) Assignee: Texas Instruments Incorporated, Dallas, TX (US)

( * ) Notice: Subject to any disclaimer, the term of this patent is extended or adjusted under 35 U.S.C. 154(b) by 423 days.

(21) Appl. No.: 12/495,790

(22) Filed: Jun. 30, 2009

(65) Prior Publication Data
US 2010/0332757 A1 Dec. 30, 2010

(51) Int. Cl.
*G06F 13/00* (2006.01)
*G06F 13/376* (2006.01)
*G06F 9/38* (2006.01)

(52) U.S. Cl. ........................................ 711/169; 712/219
(58) Field of Classification Search .................. 711/169, 711/125; 712/219
See application file for complete search history.

(56) References Cited

U.S. PATENT DOCUMENTS

| | | | |
|---|---|---|---|
| 6,145,054 A * | 11/2000 | Mehrotra et al. | 711/119 |
| 6,430,679 B1 * | 8/2002 | Heeb | 712/218 |
| 6,604,192 B1 * | 8/2003 | Arnold et al. | 712/217 |
| 6,810,475 B1 * | 10/2004 | Tardieux | 712/219 |
| 8,065,505 B2 * | 11/2011 | Chung | 712/219 |
| 2009/0024796 A1 * | 1/2009 | Nychka et al. | 711/122 |

\* cited by examiner

*Primary Examiner* — Sanjiv Shah
*Assistant Examiner* — Glenn Gossage
(74) *Attorney, Agent, or Firm* — Michael A. Davis, Jr.; W. James Brady; Frederick J. Telecky, Jr.

(57) ABSTRACT

In a system and method for write hazard handling a memory management unit policy is pre-computed for a write request using an address that is at least one clock cycle before data. The pre-computed memory management unit policy is registered and used for controlling a pipeline stall to ensure that a non-bufferable write is pipeline-protected, so that no non-bufferable location is bypassed from within the pipeline, and so that a subsequent non-bufferable read will get data from a final destination. A read request is bypassed only after a corresponding write request is updated in a write pending buffer. The write request is decoded with the write request aligned to data. The write request is registered in the write pending buffer. Arbitration logic is allowed to force the pipeline stall for a region that will have a write conflict. Read requests are stalled to protect against write hazards.

19 Claims, 4 Drawing Sheets

METHOD AND SYSTEM FOR INTEGRATED PIPELINE WRITE HAZARD HANDLING USING MEMORY ATTRIBUTES

TECHNICAL FIELD OF THE PRESENT DISCLOSURE

The present disclosure relates generally to write hazard handling in information handling systems. More particularly, the present disclosure describes a system and method useful for write hazard handling implemented using memory attributes.

BACKGROUND OF THE PRESENT DISCLOSURE

Certain pipelines may allow for reads and writes to be issued out of the programming sequence. A pipeline bypass of the write hazard for a previous programming read is a common practice to resolve this issue. However, shared processors and/or direct memory accesses (DMAs) and/or peripheral spaces may have sequential programming requirements that cannot be bypassed.

A write buffer at the end of the pipeline may allow for buffering writes to avoid additional pipeline stalls in the case of memory conflicts. However, additional write buffer hazard detection may be required to ensure reads inside the write buffer are bypassed. A write is held in the write buffer until an access is free, or until there is an overflow, but this may not occur for shared processors and/or direct memory accesses (DMA) and/or peripherals. For level 2 (L2) data cache memory accesses, a level 1 (L1) data cache memory management unit (MMU) may indicate whether memory is volatile or not, so that the memory management unit (MMU) may indicate whether the write is to be buffered. Integration of out-of-order (OOO) programming pipeline bypass and write buffer functionality remains problematic.

SUMMARY OF THE PRESENT DISCLOSURE

According to various illustrative embodiments, a system and method for write hazard handling using memory attributes are described. The various illustrative embodiments described may be used with a Harvard architecture memory subsystem but are not limited for use with such subsystems. A Harvard architecture memory subsystem is a memory subsystem in which program instructions are stored in separate memory from data, and in which each type of memory is accessed via a separate bus, allowing program instructions and data to be accessed in parallel. In one aspect, the method comprises pre-computing at least one memory management unit policy for at least one write request using at least one address that is at least one clock cycle before data. The method also comprises registering the at least one pre-computed memory management unit policy. The method also comprises using the at least one pre-computed memory management unit policy to control a pipeline stall of a pipeline to ensure that a non-bufferable write is pipeline-protected, so that no non-bufferable location is bypassed from within the pipelin and so that a subsequent non-bufferable read will get data from a final destination. The method also comprises bypassing a read request only after a corresponding write request is updated in at least one write pending buffer. The method also comprises decoding the at least one write request with the at least one write request aligned to data. The method also comprises registering the at least one write request in the at least one write pending buffer. The method also comprises allowing arbitration logic in an arbiter to force the pipeline stall for a region that will have a write conflict. The method also comprises stalling read requests to protect against write hazards.

In various aspects, the method further comprises all memory write requests going through the at least one write pending buffer. In various aspects, in the method, pre-computing the at least one memory management unit policy for the at least one write request using the at least one address comprises using a first write request pipeline stage of a central processing unit to perform the memory management unit computation based on only the at least one address, which is available in the first write request pipeline stage. In various aspects, such pre-computing uses a memory management unit disposed within a memory controller.

In various aspects, the method comprises registering the at least one pre-computed memory management unit policy in a memory interface disposed within a memory controller. In this method, bypassing a read request only after the corresponding write request is updated in the at least one write pending buffer comprises bypassing a read request only after the corresponding write request is updated in the at least one write pending buffer, which is disposed within the memory interface. This method further comprises all memory write requests going through the at least one write pending buffer. In this method, pre-computing the at least one memory management unit policy for the at least one write request using the at least one address comprises using a first write request pipeline stage of a central processing unit to perform the memory management unit computation based on only the at least one address, which is available in the first write request pipeline stage.

In various aspects, the method comprises decoding the at least one write request with the at least one write request aligned to data using a decoder disposed within a memory controller. In various aspects, the method comprises allowing the arbitration logic in the arbiter to force the pipeline stall for the region that will have the write conflict, using arbitration logic in an arbiter disposed in a memory controller.

In another aspect, a method for write hazard handling comprises determining at least one memory management unit policy by performing at least one memory management unit lookup when at least one write address is generated more than one pipeline stage in a pipeline prior to execution and write data availability. The method also comprises preventing pipeline bypass of an issued read request. The method also comprises preventing further read requests from propagating by stalling the pipeline. The method also comprises preventing placement of the write data in a write buffer. The method also comprises disabling write buffer hazard detection.

In various aspects, the method further comprises identifying at least one non-bufferable write access to an L2 data cache. This method further comprises checking the at least one write address with the at least one memory management unit policy to determine if the at least one non-bufferable write access to the L2 data cache needs to be protected. Preventing the pipeline bypass of the issued read request comprises holding the issued read request using an external bus interface until the at least one non-bufferable write access to the L2 data cache has advanced and been released at the external bus interface. This method further comprises releasing the issued read request at the external bus interface and removing the stalling of the pipeline, once the at least one non-bufferable write access to the L2 data cache has advanced and been released at the external bus interface.

In various aspects, the method further comprises managing at least one non-bufferable write access to an L1 memory by not placing the write data into the write buffer based on the at least one memory management unit lookup. In various aspects, the method further comprises integrating write ordering and write posting into a single non-bufferable/non-cacheable region that can be used for peripheral access in regular memory space. In various aspects, the method further comprises allowing the pipeline to access at least one volatile memory with a memory management unit policy.

In yet another aspect, a system for write hazard handling is provided, the system comprising a memory controller. The system also comprises a memory management unit disposed in the memory controller, the memory management unit arranged to pre-compute at least one memory management unit policy for at least one write request using at least one address that is at least one clock cycle before data. The system also comprises a memory interface disposed in the memory controller, the memory interface arranged to register the at least one pre-computed memory management unit policy. The memory controller is arranged to use the at least one pre-computed memory management unit policy to control a pipeline stall of a pipeline to ensure that non-bufferable writes are pipeline-protected, so that no non-bufferable location is bypassed from within the pipelin, and so that a subsequent non-bufferable read will get data from a final destination. The system also comprises at least one write pending buffer disposed in the memory interface, wherein a read request is bypassed only after a corresponding write request is updated in the at least one write pending buffer. The at least one write pending buffer is arranged to register the at least one write request in the at least one write pending buffer. The system also comprises a decoder disposed in the memory controller, the decoder arranged to decode the at least one write request with the at least one write request aligned to data. The system also comprises an arbiter disposed in the memory controller, the arbiter allowing arbitration logic in the arbiter to force the pipeline stall for a region that will have a write conflict, wherein the memory controller is also arranged to stall read requests to protect against write hazards. The system also comprises a central processing unit coupled to the memory controller.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which the leftmost significant digit(s) in the reference numerals denote(s) the first figure in which the respective reference numerals appear, wherein:

It is to be noted, however, that the appended drawings illustrate only typical embodiments of the present claimed subject matter and are, therefore, not to be considered limiting of the scope of the present claimed subject matter, as the present claimed subject matter may admit to other equally effective embodiments.

NOTATION AND NOMENCLATURE

Certain terms are used throughout the following description and claims to refer to particular system components and configurations. As one skilled in the art having the benefit of the present disclosure will appreciate, companies may refer to a component by different names. This document does not intend to distinguish between components that differ in name but not function. In the following discussion and in the claims, the terms "including" and "comprising" are used in an open-ended fashion, and, thus, should be interpreted to mean "including, but not limited to . . . ," and so forth. Also, the term "couple" or "couples" is intended to mean either an indirect or direct electrical connection. Thus, if a first device couples to a second device, that connection may be through a direct electrical connection or though an indirect electrical connection via other devices and/or connections. Furthermore, the term "information" is intended to refer to any data, instructions, or control sequences that may be communicated between components of a device. For example, if information is sent between two components, data, instructions, control sequences, or any combination thereof may be sent between the two components.

DETAILED DESCRIPTION OF ILLUSTRATIVE EMBODIMENTS

Illustrative embodiments of the present claimed subject matter are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

Figure 1:
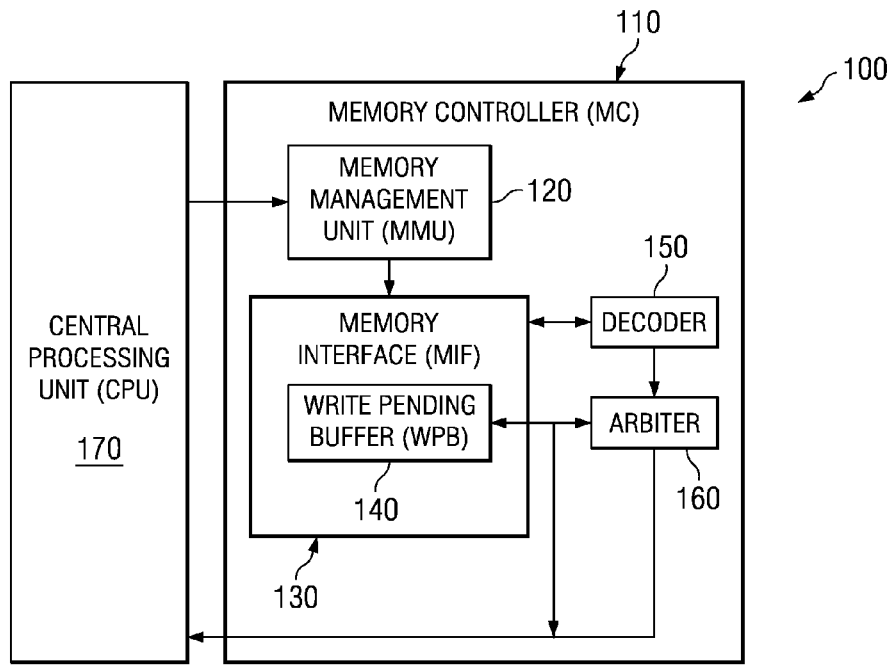
FIG. 1 schematically illustrates an example of a system for write hazard handling.

In various illustrative embodiments, as shown in FIG. 1, for example, a system 100 for write hazard handling may comprise a memory controller 110. The system 100 may also comprise a memory management unit 120 disposed in the memory controller 110. The memory management unit 120 may be arranged to pre-compute at least one memory management unit policy for at least one write request using at least one address that is at least one clock cycle before data. The system 100 may also comprise a memory interface 130 disposed in the memory controller 110. The memory interface 130 may be arranged to register the one or more pre-computed memory management unit policies. The system 100 may also comprise the memory controller 110 being arranged to use the one or more pre-computed memory management unit policies to control a pipeline stall of a pipeline to ensure that non-bufferable writes are pipeline-protected. This ensures that no non-bufferable locations are bypassed from within the pipeline and all subsequent non-bufferable reads will get data from a final destination. For example, the final destination may be an L2 data cache.

Figure 2:
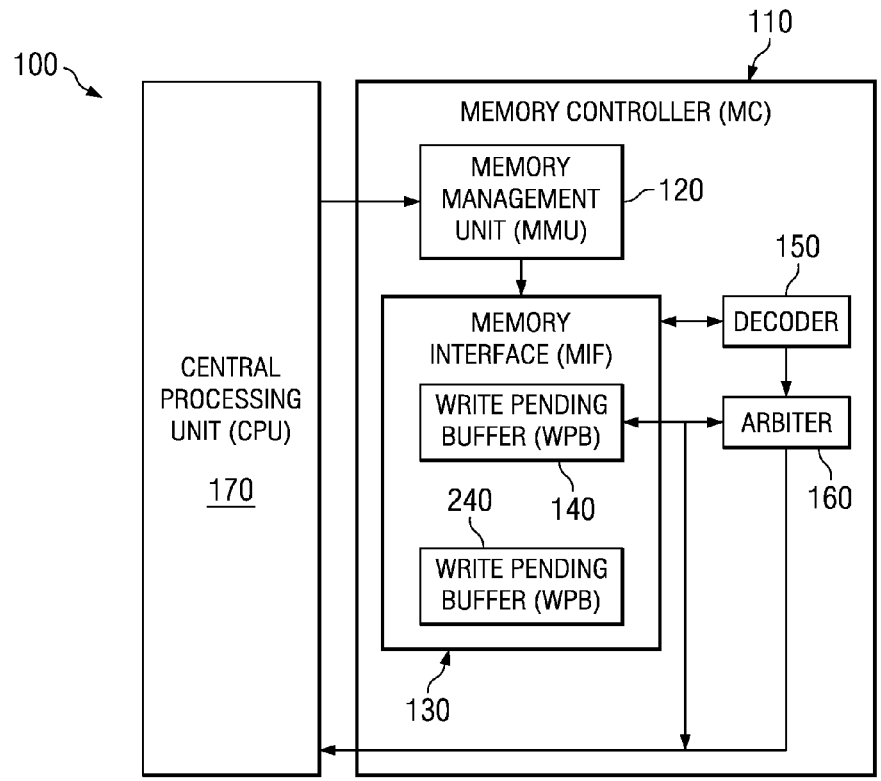
FIG. 2 schematically illustrates another example of a system for write hazard handling.

The system 100 may also comprise at least one write pending buffer 140 disposed in the memory interface 130, wherein a read request is bypassed only after a corresponding write request is updated in the one or more write pending buffers 140. In various illustrative embodiments, as shown in FIG. 2, for example, the system 100 may comprise two or more write pending buffers 140, 240. The system 100 may also comprise a decoder 150 disposed in the memory controller 110. The decoder 150 may be arranged to decode the one or more write requests with the one or more write requests aligned to data, with the one or more write pending buffers 140 arranged to register the one or more write requests in the one or more write pending buffers 140. The system 100 may also comprise an arbiter 160 disposed in the memory controller 110. The arbiter 160 may allow arbitration logic in the arbiter 160 to force the pipeline stall for a region that will have a write conflict. The memory controller 110 may also be arranged to stall read requests to protect against write hazards. The system 100 may also comprise a central processing unit 170 coupled to the memory controller 110.

Figure 3:
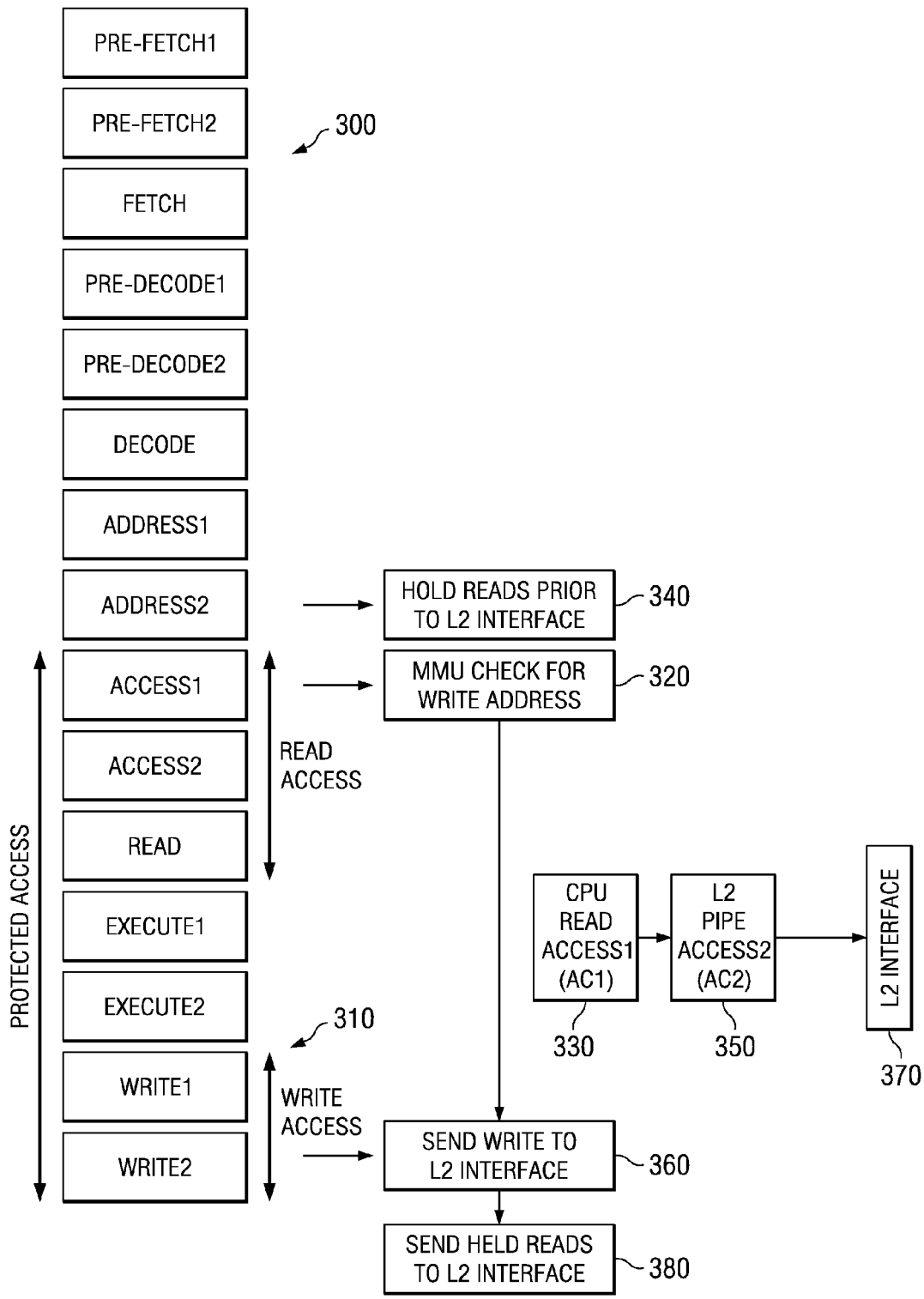
FIG. 3 schematically illustrates an example of a calculation of write policy prior to write data availability.

FIG. 3 schematically illustrates an example of the calculation of write policy prior to write data availability. In a portion of a pipeline 300, non-bufferable write accesses 310 to an L2 data cache may be identified early. The write address may be checked, as indicated at 320, with a memory management unit (MMU) policy in CPU Read Access1 ("AC1") 330 to determine if the write needs to be protected. A read stall, holding reads prior to an L2 interface, as indicated at 340, in L2 Pipe Access2 ("AC2") 350, may be done to prevent further reads from propagating. Note that, due to a critical path, the read may be unable to be stopped from within the pipeline 300. An external bus interface may hold the read until the write has advanced and been released at the external bus interface. Once the write is serviced by sending the write to the L2 interface, as indicated at 360, at the L2 data cache external bus interface 370, any reads sent in AC1 330 may be released by sending the held reads to the L2 interface, as indicated at 380, and the pipeline 300 stall may be removed. Non-bufferable accesses to L1 memory may be managed by not placing data into a write buffer based on the memory management unit (MMU) lookup 320 done in AC 1 330.

Figure 4:
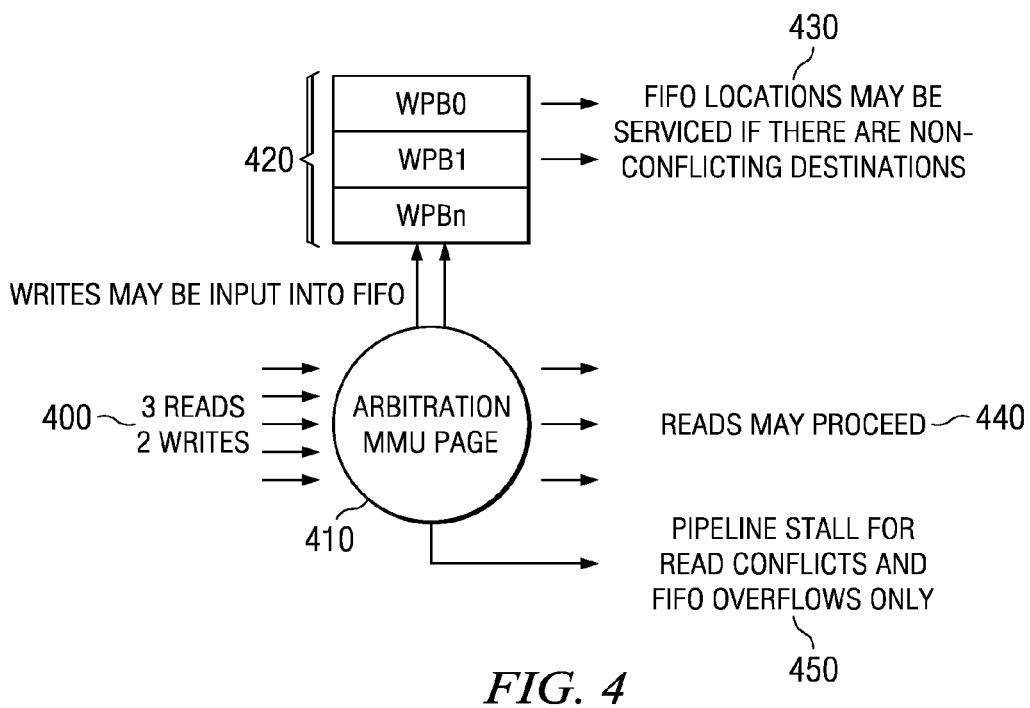
FIG. 4 schematically illustrates an example of a pipeline buffer.

FIG. 4 schematically illustrates an example of a pipeline write buffer. As indicated at 400, 3 reads and 2 writes may be input to an arbitration memory management unit (MMU) page 410. The 2 writes may then be input to first in first out (FIFO) write pending buffers 420. The first in first out (FIFO) locations may be serviced if there are non-conflicting destinations, as indicated at 430. The reads may proceed, as indicated at 440. There may be a pipeline stall for read conflicts and first in first out (FIFO) buffer overflows only, as indicated at 450.

Figure 5:
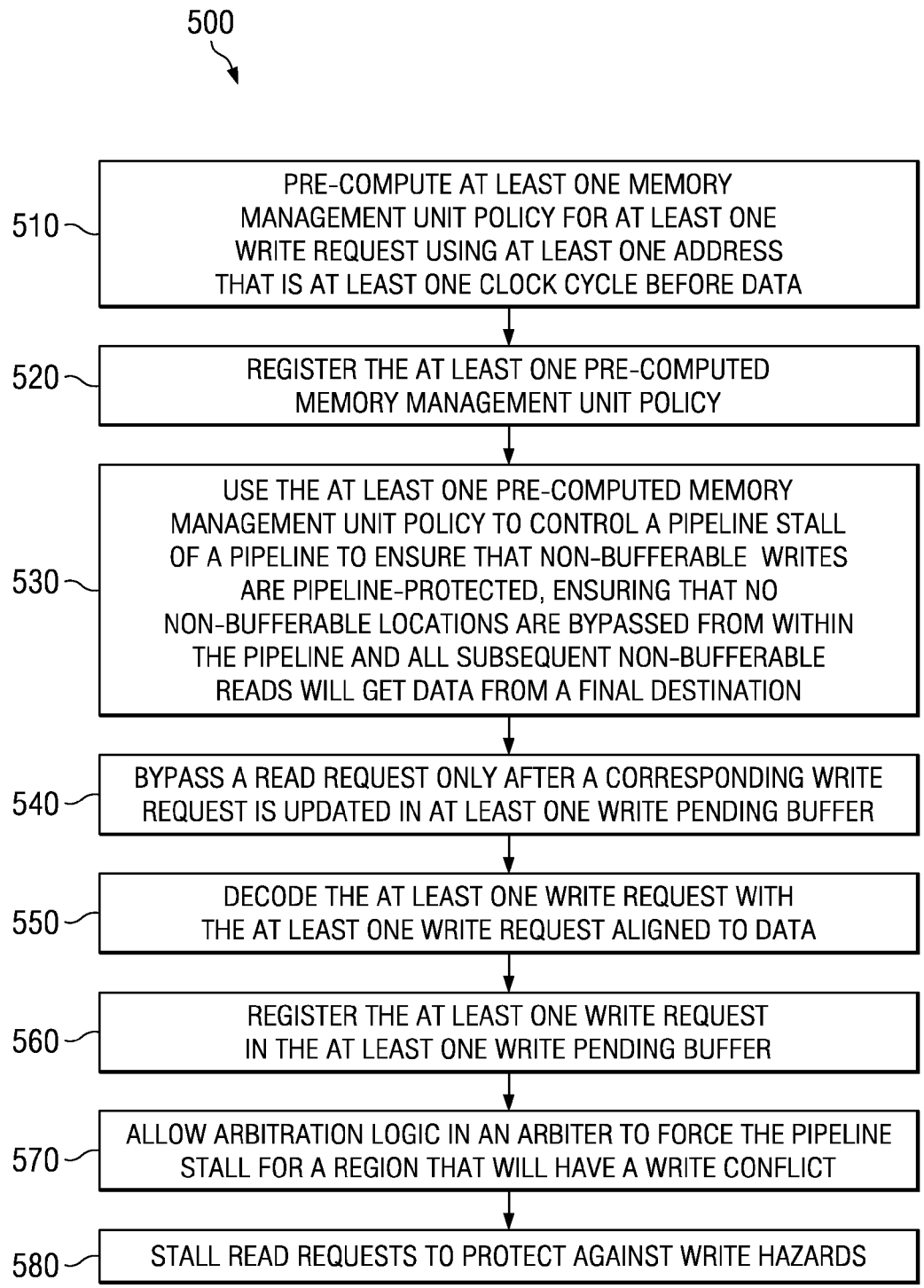
FIG. 5 schematically illustrates an example of a method useful for write hazard handling.

FIG. 5 schematically illustrates an example of a method 500 useful for write hazard handling. The method 500 comprises pre-computing at least one memory management unit (MMU) policy for at least one write request using at least one address that is at least one clockcycle before data, as shown at 510. The method 500 also comprises registering the at least one pre-computed memory management unit policy, as shown at 520. The method 500 also comprises using the at least one pre-computed memory management unit policy to control a pipeline stall of a pipeline to ensure that non-bufferable writes are pipeline-protected. This ensures that no non-bufferable locations are bypassed from within the pipeline and all subsequent non-bufferable reads will get data from a final destination, as shown at 530. The method 500 also comprises bypassing a read request only after a corresponding write request is updated in at least one write pending buffer 140, 240, as shown at 540. The method 500 also comprises decoding the at least one write request with the at least one write request aligned to data, as shown at 550. The method 500 also comprises registering the at least one write request in the at least one write pending buffer 140, 240, as shown at 560. The method 500 also comprises allowing arbitration logic in an arbiter 160 to force the pipeline stall for a region that will have a write conflict, as shown at 570. The method 500 also comprises stalling read requests to protect against write hazards, as shown at 580.

In various illustrative embodiments, all memory write requests may go through the at least one write pending buffer 140, 240. In various illustrative embodiments, pre-computing the at least one memory management unit (MMU) policy for the at least one write request using the at least one address, as shown at 510, may comprise using a first write request pipeline stage of a central processing unit 170. The first write request pipeline stage of a central processing unit 170 may be used to perform the at least one memory management unit (MMU) policy pre-computation based on only the at least one address, which is available in the first write request pipeline stage. In various illustrative embodiments, pre-computing the at least one memory management unit (MMU) policy for the at least one write request using the at least one address, as shown at 510, may comprise using a memory management unit (MMU) 120 disposed within the memory controller 110.

In various illustrative embodiments, registering the at least one pre-computed memory management unit (MMU) policy, as shown at 520, may comprise registering the at least one pre-computed memory management unit (MMU) policy in a memory interface 130 disposed within a memory controller 110. In these illustrative embodiments, bypassing a read request only after the corresponding write request is updated in the at least one write pending buffer 140, 240, as shown at 540, may comprise bypassing a read request only after the corresponding write request is updated in the at least one write pending buffer 140, 240, which is disposed within the memory interface 130. In these illustrative embodiments, all memory write requests may go through the at least one write pending buffer 140, 240. In these illustrative embodiments, pre-computing the at least one memory management unit (MMU) policy for the at least one write request using the at least one address, as shown at 510, may comprise using a first write request pipeline stage of a central processing unit 170 to perform the at least one memory management unit (MMU) policy pre-computation based on only the at least one address, which is available in the first write request pipeline stage.

In various illustrative embodiments, decoding the at least one write request with the at least one write request aligned to data, as shown at 550, may comprise using a decoder 150 disposed within the memory controller 110. In various illustrative embodiments, allowing the arbitration logic in the arbiter 160 to force the pipeline stall for the region that will have the write conflict, as shown at 570, may comprise using the arbitration logic in the arbiter 160 disposed in the memory controller 110 to force the pipeline stall for the region that will have the write conflict.

Figure 6:
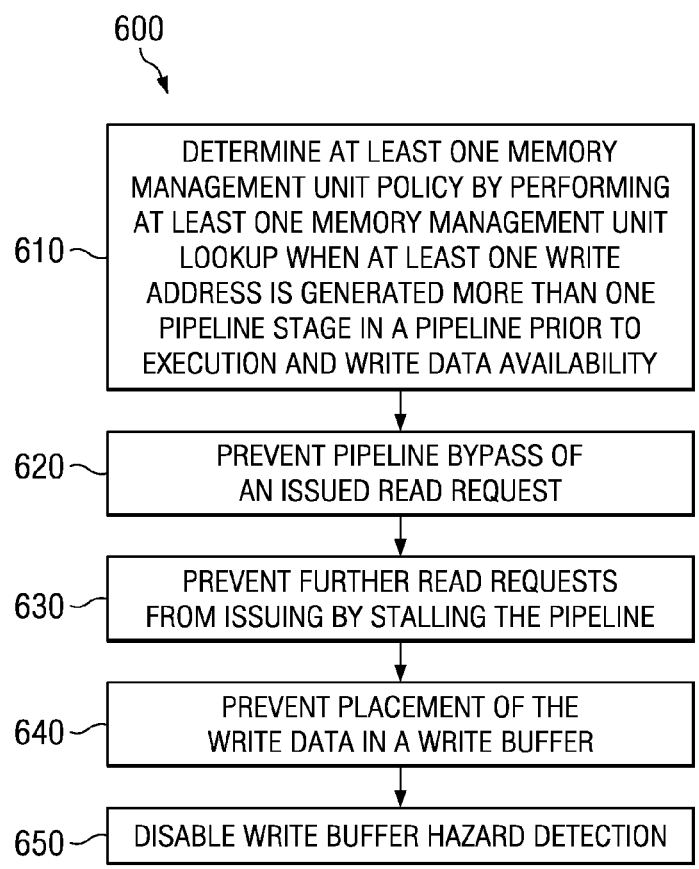
FIG. 6 schematically illustrates another example of a method useful for write hazard handling.

FIG. 6 schematically illustrates an example of a method 600 useful for write hazard handling. The method 600 comprises determining at least one memory management unit policy by performing at least one memory management unit lookup when at least one write address is generated more than one pipeline stage in a pipeline prior to execution and write data availability, as shown at 610. The method 600 also comprises preventing pipeline bypass of an issued read request, as shown at 620. The method 600 also comprises preventing further read requests from propagating by stalling the pipeline, as shown at 630. The method 600 also comprises preventing placement of the write data in a write buffer, as shown at 640. The method 600 also comprises disabling write buffer hazard detection, as shown at 650.

Various illustrative embodiments such as those illustrated in FIG. 6, may include identifying at least one non-bufferable write access to an L2 data cache. These illustrative embodiments may include checking the at least one write address with the at least one memory management unit (MMU) policy to determine if the at least one non-bufferable write access to the L2 data cache needs to be protected. These illustrative embodiments may include performing a read stall to prevent the further read requests from propagating. These illustrative embodiments may include holding the issued read request using an external bus interface until the at least one non-bufferable write access to the L2 data cache has advanced and been released at the external bus interface. These illustrative embodiments may include releasing the issued read request at the external bus interface and removing the stalling of the pipeline, once the at least one non-bufferable write access to the L2 data cache has advanced and been released at the external bus interface.

Various illustrative embodiments such as those illustrated in FIG. 6, may include managing at least one non-bufferable write access to an L1 memory by not placing the write data into the write buffer based on the at least one memory management unit lookup. Various illustrative embodiments may include integrating write ordering and write posting into a single non-bufferable/non-cacheable region that may be used for peripheral access in regular memory space. Various illustrative embodiments may include allowing the pipeline to access at least one volatile memory with a memory management unit (MMU) policy.

In accordance with the present disclosure, an apparatus, system, and method useful for write hazard handling are disclosed. In various aspects, such apparatus may also include means for enabling the write hazard handling.

In various other aspects, the system for write hazard handling may also include; means for enabling the write hazard handling. In yet various other aspects, the method for write hazard handling may also include steps for enabling the write hazard handling.

The embodiments disclosed above are illustrative only, as the present claimed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the illustrative embodiments disclosed above may be altered or modified and all such variations are considered within the scope and spirit of the present claimed subject matter. Accordingly, the protection sought herein is as set forth in the claims below.

What is claimed is:

1. A method for write hazard handling, the method comprising:
pre-computing at least one memory management unit policy for at least one write request using at least one address that is at least one clock cycle before data;
registering the at least one pre-computed memory management unit policy;
using the at least one pre-computed memory management unit policy to control a pipeline stall of a pipeline to ensure that a non-bufferable write is pipeline-protected, so that no non-bufferable location is bypassed from within the pipeline, and so that a subsequent non-bufferable read will get data from a final destination;
bypassing a read request only after a corresponding write request is updated in at least one write pending buffer;
decoding the at least one write request with the at least one write request aligned to data;
registering the at least one write request in the at least one write pending buffer;
allowing arbitration logic in an arbiter to force the pipeline stall for a region that will have a write conflict; and
stalling read requests to protect against write hazards.

2. The method of claim 1, wherein all memory write requests go through the at least one write pending buffer.

3. The method of claim 1, wherein pre-computing the at least one memory management unit policy for the at least one write request using the at least one address comprises using a first write request pipeline stage of a central processing unit to perform the at least one memory management unit policy pre-computation based on only the at least one address, which is available in the first write request pipeline stage.

4. The method of claim 1, wherein pre-computing the at least one memory management unit policy for the at least one write request using the at least one address comprises using a memory management unit disposed within a memory controller.

5. The method of claim 1, wherein decoding the at least one write request with the at least one write request aligned to data comprises using a decoder disposed within a memory controller.

6. The method of claim 1, wherein allowing the arbitration logic in the arbiter to force the pipeline stall for the region that will have the write conflict comprises using arbitration logic in an arbiter disposed in a memory controller.

7. The method of claim 1, wherein registering the at least one pre-computed memory management unit policy comprises registering the at least one pre-computed memory management unit policy in a memory interface disposed within a memory controller.

8. The method of claim 7, wherein bypassing a read request only after the corresponding write request is updated in the at least one write pending buffer comprises bypassing a read request only after the corresponding write request is updated in the at least one write pending buffer, which is disposed within the memory interface.

9. The method of claim 8 wherein all memory write requests go through the at least one write pending buffer.

10. The method of claim 8, wherein pre-computing the at least one memory management unit policy for the at least one write request using the at least one address comprises using a first write request pipeline stage of a central processing unit to perform the at least one memory management unit policy pre-computation based on only the at least one address, which is available in the first write request pipeline stage.

11. A method for write hazard handling, the method comprising:
determining at least one memory management unit policy by performing at least one memory management unit lookup when at least one write address is generated more than one pipeline stage in a pipeline prior to execution and write data availability;
using the memory management unit policy, preventing pipeline bypass of an issued read request;
using the memory management unit policy, preventing further read requests from propagating by stalling the pipeline;
using the memory management unit policy, preventing placement of the write data in a write buffer; and using the memory management unit policy, disabling write buffer hazard detection.

12. The method of claim 11, further comprising managing at least one non-bufferable write access to a level 1 (L1) memory by not placing the write data into the write buffer based on the at least one memory management unit lookup.

13. The method of claim 11, further comprising integrating write ordering and write posting into a single non-bufferable/non-cacheable region that can be used for peripheral access in regular memory space.

14. The method of claim 11, further comprising allowing the pipeline to access at least one volatile memory with the memory management unit policy.

15. The method of claim 11, further comprising identifying at least one non-bufferable write access to a level 2 (L2) data cache.

16. The method of claim 15, further comprising checking the at least one write address with the at least one memory management unit policy to determine if the at least one non-bufferable write access to the L2 data cache needs to be protected.

17. The method of claim 11, wherein preventing the pipeline bypass of the issued read request comprises holding the issued read request using an external bus interface until the at least one non-bufferable write access to the L2 data cache has advanced and been released at the external bus interface.

18. The method of claim 17, further comprising releasing the issued read request at the external bus interface and removing the stalling of the pipeline, once the at least one non-bufferable write access to the L2 data cache has advanced and been released at the external bus interface.

19. A system for write hazard handling, the system comprising:

a memory controller;
a memory management unit disposed in the memory controller, the memory management unit arranged to pre-compute at least one memory management unit policy for at least one write request using at least one address that is at least one clock cycle before data, and the memory controller arranged to use the at least one pre-computed memory management unit policy to control a pipeline stall of a pipeline to ensure that a non-bufferable write is pipeline-protected, so that no non-bufferable location is bypassed from within the pipeline and so that a subsequent non-bufferable read will get data from a final destination;
a memory interface disposed in the memory controller, the memory interface arranged to register the at least one pre-computed memory management unit policy;
at least one write pending buffer disposed in the memory interface, wherein a read request is bypassed only after a corresponding write request is updated in the at least one write pending buffer, the at least one write pending buffer arranged to register the at least one write request in the at least one write pending buffer;
a decoder disposed in the memory controller, the decoder arranged to decode the at least one write request with the at least one write request aligned to data;
an arbiter disposed in the memory controller, the arbiter allowing arbitration logic in the arbiter to force the pipeline stall for a region that will have a write conflict, wherein the memory controller is also arranged to stall read requests to protect against write hazards; and
a central processing unit coupled to the memory controller.

* * * * *